Oct. 30, 1962 W. S. TONSFELDT 3,060,667
BEET TOPPING AND HARVESTING MACHINE
Filed April 7, 1960 2 Sheets-Sheet 1
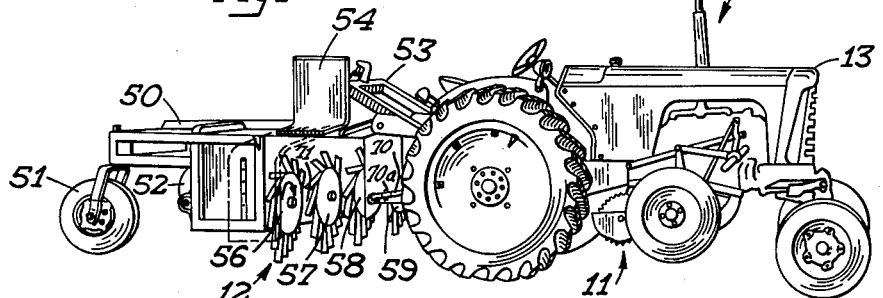
INVENTOR.
WAYNE S. TONSFELDT
BY John W. Adams
ATTORNEY Oct. 30, 1962 W. S. TONSFELDT 3,060,667
BEET TOPPING AND HARVESTING MACHINE
Filed April 7, 1960 2 Sheets-Sheet 2
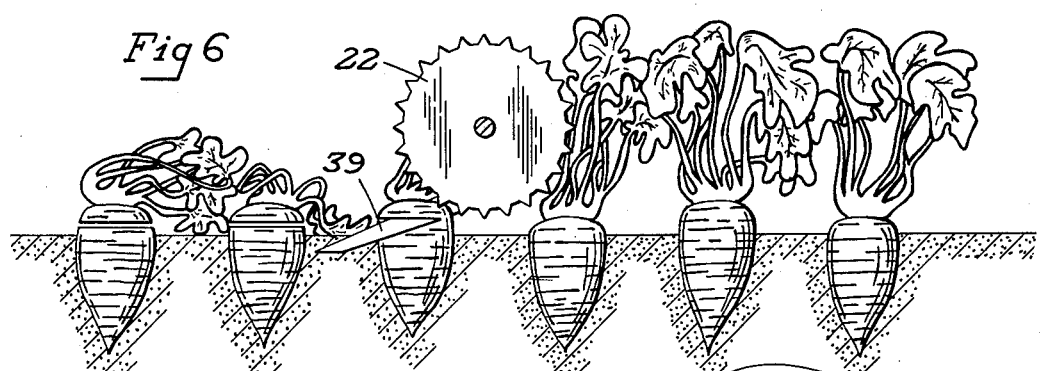
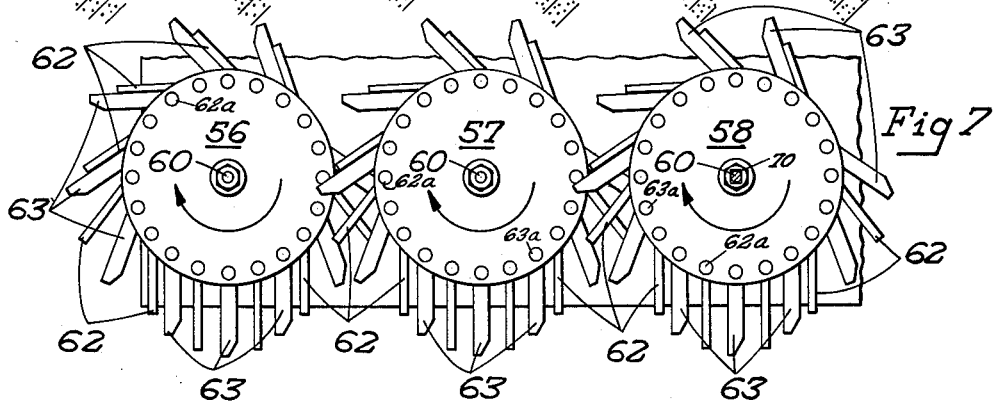
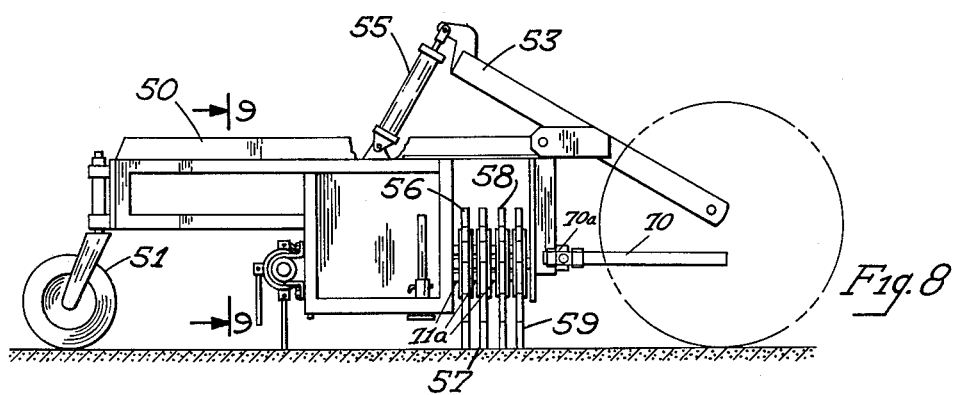
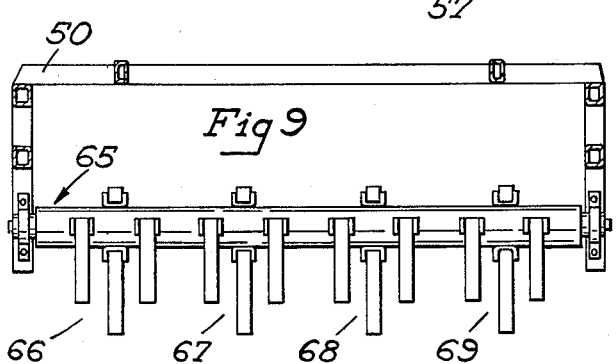
INVENTOR.
WAYNE TONSFELDT
BY
John W. Adams
ATTORNEY

United States Patent Office 3,060,667
Patented Oct. 30, 1962

3,060,667
BEET TOPPING AND HARVESTING MACHINE
Wayne S. Tonsfeldt, Sabin, Minn.
Filed Apr. 7, 1960, Ser. No. 20,575
6 Claims. (Cl. 56—121.45)

The present invention relates generally to an improved beet topping and harvesting machine, and more particularly to a beet topper which, in one pass, tops the beet and mulches or windrows the cuttings. In this connection, the topping portion of the apparatus is arranged to cut a predetermined amount of material from the top of each individual beet body, regardless of the distance which the beet body top protrudes above the surface of the ground. The mulching portion of the apparatus is arranged to clean the topped beet body by shaking adherent earth therefrom prior to the time the beet is harvested, and in addition, substantially removes the cut toppings from the area of the beet rows.

At the present time, beet toppers normally require that a rotary beater or the like precede the topper at least two runs, these runs being prior to the time at which the topper can function. The present apparatus makes it possible to top, mulch and remove the toppings in one single operation. In addition, the mulching operation prepares the beet row for removal of beets therefrom by clearing the toppings from the area and frees any clinging earth from the beet body prior to lifting from the soil.

In accordance with the apparatus of the present invention, the topper portion includes a gauge wheel in combination with a topping knife, the gauge wheel being adapted to predetermine the depth of the cut for an individual beet and being further adapted to restrain or keep the beet body for at least a portion of the time during which the knife is performing the cutting operation. The mulching and windrowing portion of the apparatus follows the topping, and includes at least one mulching wheel which is adapted for rotation about a central axis, and which has a plurality of earth beating radial arms extending therefrom, the mulching wheel being disposed substantially transversely to the direction of travel of the apparatus of the present invention. In this manner, it is possible to initially top the beet to a predetermined level, and subsequently remove the toppings from the beet row in order that normal harvesting of the beet bodies can proceed. Inasmuch as the toppings may be valuable as a mulch material or as a feed material, the mulching and windrowing of this portion of the product is an operation having economic significance.

Therefore, it is the object of the present invention to provide an improved beet topper and topping mulcher and windrowing apparatus which is arranged to sever tops from individual beet bodies to a selective depth depending upon the growth characteristics of the beet being topped, and furthermore, providing for efficient and effective removal of the toppings from the area of the beet row to be harvested.

It is another object of the present invention to provide an improved beet topper and topping mulcher and windrowing apparatus which is arranged to top individual beet bodies to a selective cutting depth, and furthermore is arranged to efficiently remove the tops from the area of the beet to be harvested, and which is further arranged to separate adhering earth from the beet body prior to the time the beet is lifted from the soil.

It is yet another object of the present invention to provide an mproved beet topper and topping mulcher which, in one pass, tops the beet and removes the toppings from the row, and otherwise prepares the beet body for lifting from the soil.

Other and further objects of the present invention will become apparent to those skilled in the art upon a further study of the following specification, appended claims and accompanying drawings, which:

FIG. 1 is a reduced side view of the combined topping and mulching assembly shown as the assembly is mounted on an ordinary farm tractor;

FIG. 2 is an isometric view at a somewhat larger scale showing the beet topping arrangement of the present invention showing the gauge wheels as well as one of the drive wheels of the topping apparatus (the other drive wheel being removed);

FIG. 3 is a side view drawn at a still larger scale showing the topping apparatus of the present invention;

FIG. 4 is a top plan view drawn at a scale somewhat smaller than FIG. 3 and showing a segment of the topping apparatus of the present invention;

FIG. 5 is a rear view drawn at a scale intermediate the scales used in FIGS. 3 and 4 of the topping apparatus of the present invention;

FIG. 6 is a partial side view drawn at a scale substantially the same as used in FIG. 5 and showing the topping apparatus of the present invention showing the operation of the gauge wheels in connection with a row of sugar beets;

FIG. 7 is a front view drawn at a scale substantially larger than that used in FIG. 1 and showing the mulching and windrowing portion of the apparatus showing the mulching wheels at rest;

FIG. 8 is a side view drawn at a scale intermediate the scale used in FIGS. 1 and 7 and showing the mulching apparatus shown in detail, the height selecting mechanism for the mulching arrangement being shown in substantial detail, and further showing a flailing apparatus utilized in the mulching operation; and, FIG. 9 is a vertical sectional view taken substantially along the line 9—9 and showing the mulching and windrowing portion of the apparatus showing the flailing arms at rest.

According to the preferred embodiment of the present invention, a beet topping and mulching apparatus generally designated 10 includes a topper assembly, generally designated 11 and a mulching assembly generally designated 12. The apparatus is adapted to be mounted for operation on a conventional farm tractor such as the tractor 13. Referring now particularly to the topping assembly 11, particularly the portions shown in FIG. 2, there is provided a mounting frame or cross-bar frame 15 upon which the topping assembly is mounted or suspended, the frame 15 being adapted for mounting on the frame of the tractor 13. The assembly is further provided with drive wheels 16—16 on either side of the cutting assembly, the drive wheels being preferably arranged in front of the drive wheels of the tractor. The drive wheels 16 provide rotational energy to the shaft 18 in accordance with the speed of the unit, shaft 18 being utilized as a main drive shaft for all of the various individual gauge disk assemblies. The entire topping apparatus is pivoted for rotation about shaft 19. A suitable housing member such as the housing 20 provides for free rotation of the assembly about pivot shart 19. Again, this particular suspension arrangement is conventional in the art and no unusual problems are expected to be encountered by those skilled in the art. During operation, the gauge wheels preferably ride at a point just slightly above the surface of the soil.

Referring now to the gauge wheel assemblies in particular, as best shown in FIGS. 2 and 3, a ganged arrangement including 2, 3, 4 or more gangs is considered to be most useful for expeditious cutting of the row planted beets. Accordingly, the various gauge wheel assemblies generally designated 22, 23, 24 and 25 each of which is identical to one another, include a plurality of circumferentially serrated or toothed gauge wheels. With reference to the assembly 22, the individual wheels 27, 28, 29 and 30, are arranged for rotation in suitable bearings located in shaft housing 32 and 33. For best results, it is preferred that the various teeth respectively designated by the reference characters 27a, 28a, 29a and 30a from the serrations are arranged in staggered relationship circumferentially, one wheel from the other. Such an arrangement obviously provides for more uniform tracking of the gauges. The drive chain 34 is driven from sprocket 34A which is secured to shaft 18 and which provides for positive rotation of the individual gauge wheels, sprocket 34B being secured for rotation with shaft 31. The rate of speed of the outer circumference is always equal to the rate of speed of the assembly, hence there is no digging or binding of the individual gauge wheels as they move along the surface of the ground. The proper linkage relationships and inter-relationships will be, of course, dependent upon the physical dimensions of the assembly and, of course, obvious to anyone skilled in the art. The individual ganged gauge assemblies are suspended from the shaft housing 21, which houses shaft 18, by a pair of lateral draw members 36 and 37. In operation, the individual assemblies are free to pivot about drive shaft 18, the draw linkages 36 and 37 being secured to a separate housing segment 38, this segment being freely pivoted about shaft 18. In order to prevent accumulation of tops and the like, a plurality of cleaning bars such as the bars 35—35 are interposed between the various individual wheels of the gauge assembly. The individual gauge assemblies each include an angularly disposed cutting member or knife such as the knives 39. The individual knife members are suspended from and secured to the housing 33 by suitable linkages, and are also connected for forward thrust to the housing 21 by means of a suitable draw bar 44. This assembly arrangement is representative of the others in the various individual units, each assembly being identical, hence further detailed discussion is not considered necessary. Because of this suspension arrangement of each knife 39 as best shown in FIGS. 3, 4 and 5, suitable adjustments as to cutting height may be made depending upon the condition of the soil, the beets to be harvested, and the condition of the individual gangs of gauge wheels. Normally, it is preferred to have the cutting edge arranged substantially in a plane common to the bottom or tip of the teeth in the serrated gauge wheels. In other words, the blade is arranged substantially tangent to the outer periphery of the individual gauge wheels. Therefore, upon traversing a beet row, the individual gauge wheel assemblies upon striking a beet will pierce the top of the beet downwardly a distance substantially equal to the length of the individual serrated teeth. While the teeth are in contact with the beet, the leading edge surface 39A of knife 39 comes ino contact with the beet and initiates a cut therealong, the depth of the cut being essentially determined by the length of the individual serrations on the gauge wheels. Inasmuch as the individual assembly, for example assembly 22 is basically free to pivot about shaft 18 through housing segment 38, the cutting unit will assume the proper elevation or angle and perform a cut across the top portion of the beet, this cut being at a desired distance from the beet top proper. Inasmuch as each of the individual beet bodies extend outwardly from the surface of the soil a random distance, it can be seen that the apparatus of the present invention performs the topping operation with a maximum amount of uniformity and a minimum amount of waste inasmuch as the cutting depth is determined by the elevation of the beet body, and not by any random preselected topping system. In addition, the individual positive rotation of the gauge wheels tends to "keep" or restrain the beet body against reactive movement caused by contact with the cutting edge 39A of the knife member 39 during the topping of the beet body.

Referring now to FIG. 2 of the drawings, a beet top guide generally designated 46 is provided having a pair of rubber tired wheels or the like 47—47, this assembly being provided to assist in breaking heavy tops and holding them down in order to prevent them from catching on the knife supporting or draw member 44. It will be noted that this assembly does not support the gauge wheels or knives in any way, and accordingly it is used only when the conditions of the beet tops indicate its usefulness.

Referring now to the mulching attachment generally designated 12, the apparatus includes a trailer or other suitable support mechanism 50 having a pair of caster wheels or the like 51 and 52 supporting the rear portion of the assembly. The front portion is supported by the draw bar assembly 53 which is arranged to be conventionally coupled to the rear of the tractor 13 in a conventional manner. In order to adjust the elevation to the desired level, a double acting hydraulic cylinder 55 is arranged in operative relationship with the hydraulic system of the tractor 13. The mulching or windrowing operation of the beet tops is carried out by means of the gang or group of mulching wheels 56, 57, 58 and 59. Each of these wheels is disposed adjacent to or between the beet row being treated and has a central axis or drive 60 which rotates the individual wheels at the desired speed. Pivotally attached on the pivot pins 62a to the periphery of the wheels 56, 57, 58 and 59 are a plurality of relatively soft resilient beaters which for simplicity, are numbered on wheel 56 only, these beaters being designated 62—62. Also pivotally attached on the pivot pins 63a to the mulching wheels are a plurality of relatively stiff arms or the like 63—63 which assist in the mulching and windrowing operation. While the arms 63 are attached generally in "chord-like" fashion, and remain in that position during mulching, the beaters 62—62, which are fabricated from any suitable relatively soft resilient material such as rubber strips or the like which will not injure the beet tops but which will serve to sweep away any foliage left by the arms 63—63 which are shorter than the resilient beaters 62—62. Centrifugal force causes these pivotally mounted beaters and arms to extend radially outwardly and hence the beaters will engage the cut material and move the same out of the path of the various rows. Therefore, subsequent to the topping operation per se, the tops may be essentially removed from the individual rows by the series of mulching wheels. For most efficient operation, the various wheels 56, 57, 58 and 59 are off-set axially, one from the other, in order that they do not mutually interfere. Therefore, it is possible to position these wheels closely, one from the other, and obtain the advantages of this close relationship without having the wheels interfere, one with the other. Of course, in this axial off-set, it is preferable that the least degree of offset be employed in the last mulch wheel or unit. Therefore, upon moving in a forward direction while mulching tops and the like, the forward motion of the equipment is not normally expected to interfere with the proper mulching or windrowing. Power for rotating the mulching wheel 58 may conveniently be provided by the power take-off 70 through universal joint 70a from the tractor. The drive shafts 60 for the respective mulching wheels 56, 57 and 59 are connected with the shaft of wheel 58 as by chain and sprocket driving connections disposed within the housing 71 illustrated in FIG. 1. For windrowing the toppings only, the cylinder 55 is adjusted so that the beaters 62—62 extend radially downwardly only a distance sufficient to bring them into contact with the surface of the soil. If, on the other hand, it is desired to spread the tops along the soil surface for mulching the tops, the cylinder 55 is adjusted so that the beaters make beating contact with the surface of the soil thereby providing a spreading action on the material remaining in the row. In addition, the baffle plate 54 is arranged to be turned down over the row of beaters and accordingly prevents the beet tops from being thrown out and randomly scattered, and instead retains them in a single row. In either case, however, the action of the beaters assists in treating the beets so that the adherent soil is removed therefrom, thereby facilitating easy lifting of the beet body from the ground. This lifting, of course, will be conducted in a subsequent operation.

In addition to the mulching and windrowing apparatus and arrangement described hereinabove, an additional set of flailing arms generally designated 65 and best shown in FIG. 9 may be conveniently provided at the rear of the assembly 12, these arms being driven, for example, by the power take-off 70 through universal joint 70a. Chain and sprocket driving connections 71a are shown between the respective drive shafts of the discs 56, 57 and 59. In this connection, groups of flailing arms such as the groups 66, 67, 68 and 69 are merely arranged at right angles to the disks 56, 57, 58 and 59, and assist in further general beating and consequent cleaning of the beet bodies while they remain in the soil. The groups of flailing arms are disposed and spaced, of course, in line with the various beet rows.

In operation, the operator merely drops the topping assembly 11 into operative relation to the ground, and proceeds in a forward direction along the various beet rows. The topping is accomplished by the individual cutter assemblies and the row is left with the tops lying randomly about. As the unit proceeds along the row, the mulching and windrowing apparatus comes into contact with the beet tops and effectively moves them to the side and out of the beet row. In addition to removing the beet tops, the arms of the mulching apparatus tend to remove adherent earth or soil from the beet body prior to the lifting operation and hence effectively assist in the subsequent harvesting of the beets. The operator therefore is able to efficiently harvest the beets and also obtain a beet product which is free from adherent soil and also free from the tops and the like. Inasmuch as the beet grower may be docked for having foreign substances such as soil and tops in his delivered beet product, it is economically sound practice for him to remove these foreign materials from his beets prior to delivery to the processing station.

It will be understood that the examples given hereinabove are for purposes of illustration only and accordingly are not to be construed as a limitation upon the coverage to which this invention is entitled. Those skilled in the art will accordingly be able to deviate from the illustrative examples given herein without actually departing from the spirit and scope of the present invention.

I claim:

1. In combination, a sugar beet topping and mulching apparatus for severing tops from sugar beets and for removing the severed tops from the area of the beet body prior to harvesting, said apparatus having a topping portion and a mulching portion and being adapted for operation along a certain predetermined direction, said topping portion including a carriage member, an arm pivotally mounted on said carriage member and including a gauge wheel assembly with a toothed gauge wheel rotatably mounted on said arm for rotation on an axis disposed in horizontally spaced relation from the pivotal mounting of said arm, and also including a topping knife mounted on said arm and extending across below the gauge wheel in spaced relation therebelow, means driving said gauge wheel at the same speed and direction as would be produced if said gauge wheel were rolling over the ground in contact therewith, the depth of said circumferential serrations being substantially equal to the depth of the top cutting desired, said mulching portion including a mulching wheel adapted for rotation about an axis thereof disposed parallel to the direction of operation of the apparatus and having a plurality of earth beating radial arms extending therefrom, at least certain of said radial beating arms being of resilient flexible material.

2. In combination, a sugar beet topping and mulching apparatus for severing tops from sugar beets and for removing the severed tops from the area of the beet body prior to harvesting, said apparatus having a topping portion and a mulching portion and being adapted for operation along a certain predetermined direction, said topping portion including an arm pivotally mounted on said carriage bar and including a gauge wheel assembly rotatably mounted on said arm at a point horizontally spaced from said arm mounting and including a topping knife having a gauge wheel cooperating therewith, said gauge wheel being arranged to support said topping knife and having a plurality of beet piercing circumferential serrations therearound the depth of said circumferential serrations being substantially equal to the depth of the top cutting desired, means driving said gauge wheel at the same speed and direction as would be produced if said gauge wheel were rolling over the ground in contact therewith, said mulching portion including a mulching wheel adapted for rotation about a central axis thereof and having a plurality of alternately stiff and resiliently flexible earth beating radial arms pivotally mounted on said wheel and extending therefrom, said mulching wheel being disposed substantially transversally to said predetermined direction.

3. A sugar beet topping apparatus arranged to sever tops at a uniform depth from individual sugar beet bodies disposed in growing position in the soil, said apparatus being arranged for operation at a certain predetermined rate of speed and comprising a carriage member, knife means for severing the tops from the beet body, and holding and gaging means arranged in cooperative relationship with said knife means for holding said beet body during cutting and for gauging the depth of the topping cut, said holding and gauging means including an arm pivotally mounted on said carriage member and including a gauge wheel assembly with a toothed gauge wheel rotatably mounted on said arms for rotation on an axis disposed in horizontally spaced relation from the pivotal mounting of said arm, and driving means for rotating the circumference of said wheel at said certain predetermined rate of speed.

4. The sugar beet topping apparatus of claim 3 being particularly characterized in that said holding and gauging means includes a plurality of axially spaced toothed wheels arranged in closely spaced ganged relationship.

5. A sugar beet topping apparatus arranged to sever tops at a uniform depth from individual sugar beet bodies disposed in growing position in the soil, said apparatus being arranged for operation at a certain predetermined rate of speed and including knife means for severing the top from the beet body, and holding and gauging means arranged in cooperative relationship with said knife means for holding said beet body during cutting and for gauging the depth of the topping cut, said holding and gauging means including at least one circumferentially toothed wheel arranged for rotation about a central axis and arranged for pivotal suspension about a second axis, said second axis being horizontally displaced from said central axis, said holding and gauging means having driving means for rotating the circumference of said wheel at said certain predetermined rate of speed, the spacing between the teeth of the gauge wheel and said knife means being substantially equal to the depth of cut desired in the individual beet bodies.

6. The apparatus of claim 5 being particularly characterized in that said holding and gauging means includes a plurality of co-axially spaced toothed wheels arranged in closely spaced ganged relationship.

References Cited in the file of this patent
UNITED STATES PATENTS

| | | |
|---|---|---|
| 1,301,328 | Smith | Apr. 22, 1919 |
| 2,895,280 | Sorensen et al. | July 21, 1959 |